United States Patent
Miao (10) Patent No.: US 10,411,957 B2
(45) Date of Patent: Sep. 10, 2019

(54) METHOD AND DEVICE FOR INTEGRATING MULTIPLE VIRTUAL DESKTOP ARCHITECTURES

(71) Applicant: ZTE CORPORATION, Shenzhen, Guangdong Province (CN)

(72) Inventor: Xingxing Miao, Shenzhen (CN)

(73) Assignee: ZTE CORPORATION (CN)

( * ) Notice: Subject to any disclaimer, the term of this patent is extended or adjusted under 35 U.S.C. 154(b) by 80 days.

(21) Appl. No.: 15/738,131

(22) PCT Filed: Mar. 21, 2016

(86) PCT No.: PCT/CN2016/076906
§ 371 (c)(1),
(2) Date: Dec. 20, 2017

(87) PCT Pub. No.: WO2016/206414
PCT Pub. Date: Dec. 29, 2016

(65) Prior Publication Data
US 2018/0183665 A1 Jun. 28, 2018

(30) Foreign Application Priority Data
Jun. 25, 2015 (CN) .......................... 2015 1 0359714

(51) Int. Cl.
*G06F 15/177* (2006.01)
*H04L 12/24* (2006.01)
(Continued)

(52) U.S. Cl.
CPC .......... *H04L 41/0806* (2013.01); *G06F 9/452* (2018.02); *G06F 9/45558* (2013.01);
(Continued)

(58) Field of Classification Search
CPC ..... H04L 41/0806; H04L 29/08; H04L 67/08; H04L 67/1097; H04L 67/42; G06F 9/452;
(Continued)

(56) References Cited

U.S. PATENT DOCUMENTS 10,204,019 B1 * 2/2019 Talley ................. G06F 11/1464
2012/0254861 A1 10/2012 Down, Jr. et al.
(Continued)

FOREIGN PATENT DOCUMENTS

CN 103677962 A 3/2014
CN 104331375 A 2/2015
(Continued)

*Primary Examiner* — Jonathan A Bui
(74) *Attorney, Agent, or Firm* — McDonald Hopkins LLC (57) ABSTRACT

The present disclosure provides a method and device for integrating multiple virtual desktop architectures. The method includes: when a user accesses a network disk through a designated virtual desktop architecture in multiple virtual desktop architectures, acquiring an association relationship between the user and a designated network disk in the multiple network disks; and executing an operation of mounting the designated virtual desktop architecture to the designated network disk according to a current state of the designated network disk and the association relationship.

16 Claims, 4 Drawing Sheets

When a user accesses a network disk through a designated virtual desktop architecture in multiple virtual desktop architectures, an association relationship between the user and a designated network disk in the multiple network disks is acquired — S102

An operation of mounting the designated virtual desktop architecture to the designated network disk is executed according to a current state of the designated network disk and the association relationship — S104

(51) Int. Cl.
  *H04L 29/08* (2006.01)
  *G06F 9/451* (2018.01)
  *G06F 9/455* (2018.01)
  *H04L 29/06* (2006.01)

(52) U.S. Cl.
  CPC .............. *H04L 29/08* (2013.01); *H04L 67/08* (2013.01); *H04L 67/1097* (2013.01); *H04L 67/42* (2013.01); *G06F 2009/4557* (2013.01); *G06F 2009/45583* (2013.01); *G06F 2009/45595* (2013.01)

(58) Field of Classification Search
  CPC ........... G06F 9/4558; G06F 2009/4557; G06F 2009/45583; G06F 2009/45595
  See application file for complete search history.

(56) References Cited

U.S. PATENT DOCUMENTS

| | | | |
|---|---|---|---|
| 2013/0227564 A1* | 8/2013 | Asayama | G06F 9/45558 718/1 |
| 2013/0332610 A1 | 12/2013 | Beveridge | |
| 2018/0285202 A1* | 10/2018 | Bhagi | G06F 11/1464 |

FOREIGN PATENT DOCUMENTS

| | | | |
|---|---|---|---|
| CN | 105141694 A | 12/2015 | |
| EP | 2357558 A2 | 8/2011 | |

* cited by examiner

METHOD AND DEVICE FOR INTEGRATING MULTIPLE VIRTUAL DESKTOP ARCHITECTURES

TECHNICAL FIELD

The present disclosure relates to the field of communications, and more particularly to a method and device for integrating multiple virtual desktop architectures.

BACKGROUND

A Virtual Desktop Infrastructure (VDI) virtualizes a user's desktop by running an Operation System (OS) through a server of a data center. The user is connected with a virtual desktop through a client computation protocol from client equipment (client or home Personal Computer (PC)), and the user has an experience of accessing a traditional local installation desktop when accessing his/her own desktop.

The implementation of a Virtual Operating System Infrastructure (VOI) is improved from desktop application delivery to standardization and instant distribution of the Operating System (OS). The design difference from the VDI lies in that a terminal fully utilizes local system resources without a Graphics Processing Unit (GPU) virtualization technology and a Central Processing Unit (CPU) virtualization technology, but the virtualized OS completely works over local physical hardware by directly realizing data redirection of a physical storage medium on an input/output (I/O) layer, and there are direct internal addresses instead of remote port mapping relationships for a drive program, an application program and various pieces of equipment. Therefore, the current problems of large server and network consumption and low compatibility between software and hardware in the VDI are avoided.

Both the virtual desktops of the VDI and the VOI have the advantages and disadvantages, and are widely applied. However, it is difficult to combine the advantages of the VDI and the VOI in the related art to realize data sharing. Any effective solution has not been proposed yet at present for the above-mentioned problem in the related art.

SUMMARY

The embodiments of the present disclosure are mainly directed to provide a method and device for integrating multiple virtual desktop architectures, which are used to at least solve the problem in the related art of difficulty in integration a VDI with a VOI.

According to an aspect of the embodiments of the present disclosure, a method for integrating multiple virtual desktop architectures is provided. The method includes: when a user accesses a network disk through a designated virtual desktop architecture in multiple virtual desktop architectures, acquiring an association relationship between the user and a designated network disk in multiple network disks; and executing an operation of mounting the designated virtual desktop architecture to the designated network disk according to a current state of the designated network disk and the association relationship.

In an exemplary embodiment, the step of executing an operation of mounting the designated virtual desktop architecture to the designated network disk according to a current state of the designated network disk and the association relationship includes: when the designated network disk is in an independent state, mounting the designated virtual desktop architecture to the designated network disk according to the association relationship; when the designated network disk is in a non-independent state, unmounting a virtual desktop architecture currently mounted to the designated network disk; and when the unmounting is successful, mounting the designated virtual desktop architecture to the network disk according to the association relationship.

In an exemplary embodiment, when the virtual desktop architecture currently mounted to the designated network disk is unmounted unsuccessfully, the virtual desktop architecture currently mounted to the designated virtual desktop is closed, and an operation of continuing to unmount the currently-mounted virtual desktop architecture which has been closed is triggered; when the currently-mounted virtual desktop architecture which has been closed is unmounted successfully, the designated virtual desktop architecture is mounted to the network disk according to the association relationship; and when the currently-mounted virtual desktop architecture which has been closed is unmounted unsuccessfully, the user is informed that the designated virtual desktop architecture has been occupied, and the operation of mounting the designated virtual desktop architecture to the designated network disk is forbidden to be executed.

In an exemplary embodiment, after executing an operation of mounting the designated virtual desktop architecture to the designated network disk according to a current state of the designated network disk and the association relationship, the method further includes: deleting and/or adding an association relationship between the user and a network disk.

In an exemplary embodiment, the virtual desktop architecture includes: a VDI and a VOI.

According to another aspect of the embodiments of the present disclosure, a device for integrating multiple virtual desktop architectures is provided. The device includes: an acquisition module configured to, when a user accesses a network disk through a designated virtual desktop architecture in multiple virtual desktop architectures, acquire an association relationship between the user and a designated network disk in the multiple network disks; and an execution module configured to execute an operation of mounting the designated virtual desktop architecture to the designated network disk according to a current state of the designated network disk and the association relationship.

In an exemplary embodiment, the execution module includes: a first mounting unit configured to, when the designated network disk is in an independent state, mount the designated virtual desktop architecture to the designated network disk according to the association relationship; a first unmounting unit configured to, when the designated network disk is in a non-independent state, unmount a virtual desktop architecture currently mounted to the designated network disk; and a second mounting unit configured to, when the virtual desktop architecture currently mounted to the designated network disk is unmounted successfully, mount the designated virtual desktop architecture to the network disk according to the association relationship.

In an exemplary embodiment, the execution module further includes: a closing unit configured to, when the virtual desktop architecture currently mounted to the designated network disk is unmounted unsuccessfully, close the virtual desktop architecture currently mounted to the designated virtual desktop, and trigger an operation of continuing to unmount the currently-mounted virtual desktop architecture which has been closed; a third mounting unit configured to, when the currently-mounted virtual desktop architecture which has been closed is unmounted successfully, mount the designated virtual desktop architecture to the network disk according to the association relationship; and an informing unit configured to, when the currently-mounted virtual desktop architecture which has been closed is unmounted unsuccessfully, inform the user that the designated virtual desktop architecture has been occupied, and the operation of mounting the designated virtual desktop architecture to the designated network disk is forbidden to be executed.

In an exemplary embodiment, after executing the operation of mounting the designated virtual desktop architecture to the designated network disk according to the current state of the designated network disk and the association relationship, the device further includes: a management module configured to delete and/or add an association relationship between the user and a network disk.

In an exemplary embodiment, the virtual desktop architecture includes: a VDI and a VOI.

In the embodiments of the present disclosure, a computer storage medium is also provided. The computer storage medium may store an execution instruction, herein the execution instruction is used to execute the method for integrating multiple virtual desktop architectures in the above-mentioned embodiments.

By means of the embodiments of the present disclosure, when a user accesses a network disk through a designated virtual desktop architecture in multiple virtual desktop architectures, an association relationship between the user and a designated network disk in the multiple network disks is acquired, and an operation of mounting the designated virtual desktop architecture to the designated network disk is executed according to a current state of the designated network disk and the association relationship. It can be seen that multiple virtual desktop architectures can be mounted to the same network disk, so that multiple virtual desktop architectures realize data sharing, and the problem in the related art of difficulty in integration a VDI with a VOI is solved, and the gaps in the related art are filled.

BRIEF DESCRIPTION OF DRAWINGS

The drawings illustrated herein are intended to provide a further understanding for the present disclosure, and form a part of the present application. The exemplary embodiments and descriptions of the present disclosure are intended to explain the present disclosure, and do not form improper limits to the present disclosure. In the drawings.

DETAILED DESCRIPTION

It is important to note that embodiments in the present application and characteristics in the embodiments can be combined under the condition of no conflicts. The present disclosure will be illustrated hereinbelow with reference to the drawings and in conjunction with the embodiments in detail.

Figure 1:
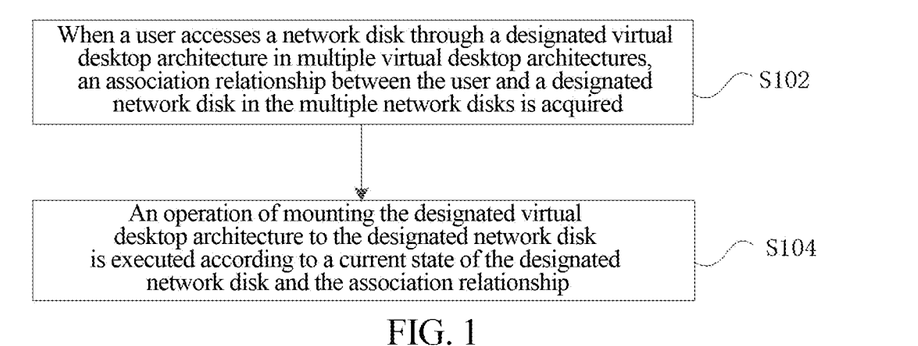
FIG. 1 is a flowchart of a method for integrating multiple virtual desktop architectures according to an embodiment of the present disclosure.

The present embodiment provides a method for integrating multiple virtual desktop architectures. FIG. 1 is a flowchart of a method for integrating multiple virtual desktop architectures according to an embodiment of the present disclosure. As shown in FIG. 1, the method includes the steps as follows.

In step S102, when a user accesses network disks through a designated virtual desktop architecture in multiple virtual desktop architectures, an association relationship between the user and a designated network disk in the multiple network disks is acquired.

In step S104, an operation of mounting the designated virtual desktop architecture to the designated network disk is executed according to a current state of the designated network disk and the association relationship.

By means of step S102 and step S104 in the embodiment of the present disclosure, when a user access network disks through a designated virtual desktop architecture in multiple virtual desktop architectures, an association relationship between the user and a designated network disk in the multiple network disks is acquired, and an operation of mounting the designated virtual desktop architecture to the designated network disk is executed according to a current state of the designated network disk and the association relationship. It can be seen that multiple virtual desktop architectures can be mounted to the same network disk, so that multiple virtual desktop architectures realize data sharing, and the problem in the related art of difficulty in integrating a VDI with a VOI is solved, and the gaps in the related art are filled.

In an alternative implementation manner of the present embodiment, a manner of executing an operation of mounting the designated virtual desktop architecture to the designated network disk according to a current state of the designated network disk and the association relationship, involved in the step S104 in the present embodiment, may be implemented in the following manners.

In step S11, when the designated network disk is in an independent state, the designated virtual desktop architecture is mounted to the designated network disk according to the association relationship.

In step S12, when the designated network disk is in a non-independent state, a virtual desktop architecture currently mounted to the designated network disk is unmounted, and when unmounting is successful, the designated virtual desktop architecture is mounted to the network disk according to the association relationship.

When the virtual desktop architecture currently mounted to the designated network disk is unmounted unsuccessfully in step S12, the virtual desktop architecture currently mounted to the designated virtual desktop is closed, and the currently-mounted virtual desktop architecture which has been closed is continued to be unmounted.

There are two following situations for the unmounting of the currently-mounted virtual desktop architecture which has been closed. When the currently-mounted virtual desktop architecture which has been closed is unmounted successfully, the designated virtual desktop architecture is mounted to the network disk according to the association relationship; and when the currently-mounted virtual desktop architecture which has been closed is unmounted unsuccessfully, the user is informed that the designated virtual desktop architecture has been occupied, and the operation of mounting the designated virtual desktop architecture to the designated network disk is forbidden to be executed.

Besides, in another alternative implementation manner of the present embodiment, after executing an operation of mounting the designated virtual desktop architecture to the designated network disk according to a current state of the designated network disk and the association relationship, the method of the present embodiment further includes: deleting and/or adding the association relationship between the user and the network disks.

In an exemplary embodiment, the virtual desktop architecture involved in the present embodiment may include: a VDI and a VOI.

In the present embodiment, a device for integrating multiple virtual desktop architectures is also provided. The device is used to implement the above-mentioned embodiments and alternative implementation manners. Those which have been illustrated will not be elaborated herein. A term 'module' used below may be a combination of software and/or hardware with predetermined functions. Although the device described by the following embodiment is better implemented by software, the implementation of hardware or the combination of software and hardware may be possible and conceived.

Figure 2:
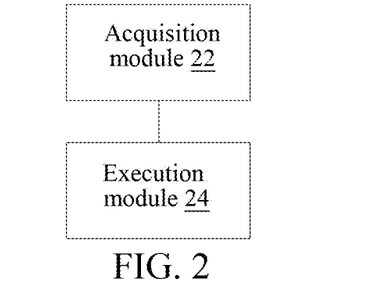
FIG. 2 is a structure block diagram of a device for integrating multiple virtual desktop architectures according to an embodiment of the present disclosure.

FIG. 2 is a structure block diagram of a device for integrating multiple virtual desktop architectures according to an embodiment of the present disclosure. As shown in FIG. 2, the device includes an acquisition module 22 and an execution module 24. The acquisition module 22 is configured to, when a user accesses network disks through a designated virtual desktop architecture in multiple virtual desktop architectures, acquire an association relationship between the user and a designated network disk in the multiple network disks. The execution module 24 coupled to the acquisition module 22 is configured to execute an operation of mounting the designated virtual desktop architecture to the designated network disk according to a current state of the designated network disk and the association relationship.

Figure 3:
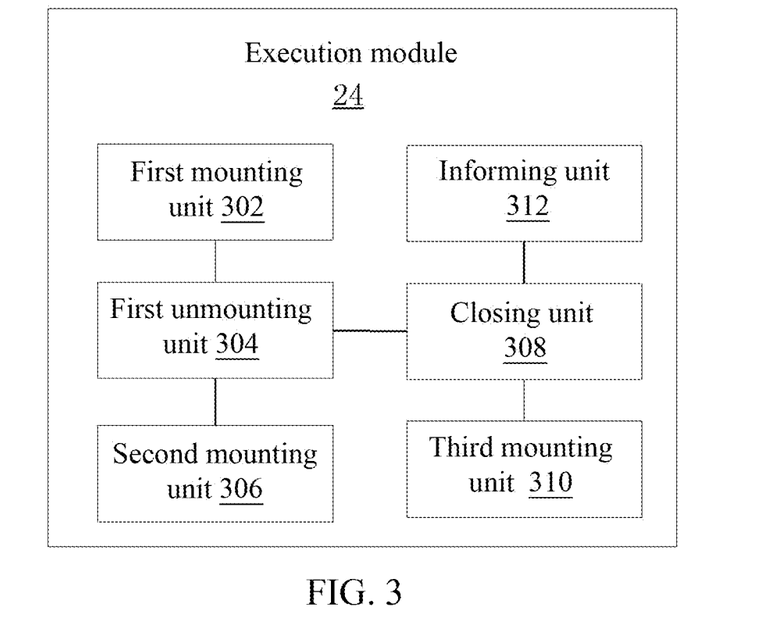
FIG. 3 is an alternative structure block diagram one of a device for integrating multiple virtual desktop architectures according to an embodiment of the present disclosure.

FIG. 3 is an alternative structure block diagram one of a device for integrating multiple virtual desktop architectures according to an embodiment of the present disclosure. As shown in FIG. 3, the execution module 24 includes: a first mounting unit 302, a first unmounting unit 304 and a second mounting unit 306. The first mounting unit 302 is configured to, when the designated network disk is in an independent state, mount the designated virtual desktop architecture to the designated network disk according to the association relationship. The first unmounting unit 304 is configured to, when the designated network disk is in a non-independent state, unmount a virtual desktop architecture currently mounted to the designated network disk. The second mounting unit 306 coupled to the first unmounting unit 304 is configured to, when the virtual desktop architecture currently mounted to the designated network disk is unmounted successfully, mount the designated virtual desktop architecture to the network disk according to the association relationship.

The execution module 24 further includes a closing unit 308, a third mounting unit 310 and an informing unit 312. The closing unit 308 coupled to the first unmounting unit 304, is configured to, when the virtual desktop architecture currently mounted to the designated network disk is unmounted unsuccessfully, close the virtual desktop architecture currently mounted to the designated virtual desktop, and trigger an operation of continuing to unmount the currently-mounted virtual desktop architecture which has been closed. The third mounting unit 310 coupled to the closing unit 308 is configured to, when the currently-mounted virtual desktop architecture which has been closed is unmounted successfully, mount the designated virtual desktop architecture to the network disk according to the association relationship. The informing unit 312 coupled to the closing unit 308 is configured to, when the currently-mounted virtual desktop architecture which has been closed is unmounted unsuccessfully, inform the user that the designated virtual desktop architecture has been occupied, and the operation of mounting the designated virtual desktop architecture to the designated network disk is forbidden to be executed.

Figure 4:
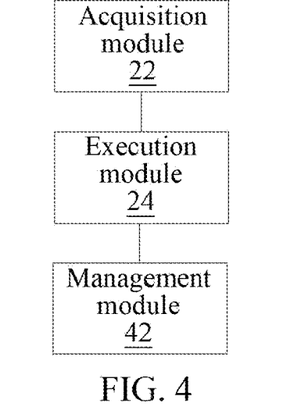
FIG. 4 is an alternative structure block diagram two of a device for integrating multiple virtual desktop architectures according to an embodiment of the present disclosure.

FIG. 4 is an alternative structure block diagram two of a device for integrating multiple virtual desktop architectures according to an embodiment of the present disclosure. As shown in FIG. 4, after executing an operation of mounting the designated virtual desktop architecture to the designated network disk according to a current state of the designated network disk and the association relationship, the device may further include: a management module 42, coupled to the execution module 24, and configured to delete and/or add the association relationship between the user and the network disks.

In an exemplary embodiment, the virtual desktop architecture includes: a VDI and a VOI.

The present disclosure will be illustrated hereinbelow with alternative embodiments of the present disclosure.

Figure 5:
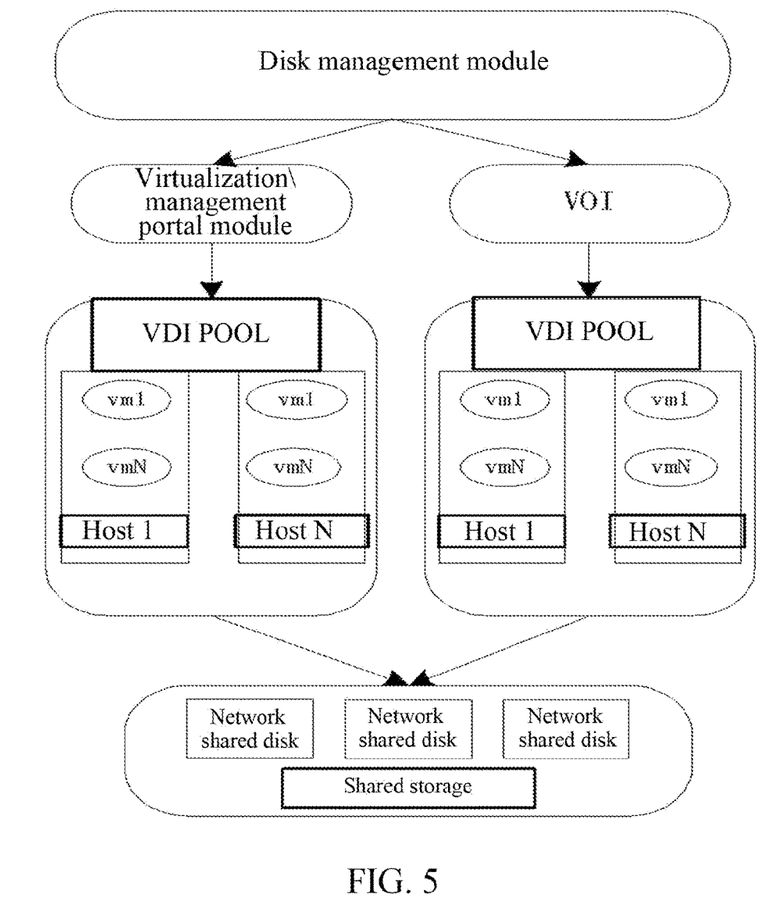
FIG. 5 is a structure block diagram of an integrated system for VOI/VDI virtual desktop network shared disks according to an alternative embodiment of the present disclosure.

The present alternative embodiment provides an integrated system for VOI/VDI virtual desktop network shared disks. FIG. 5 is a structure block diagram of a system for integrating VOI/VDI virtual desktop network shared disks according to an alternative embodiment of the present disclosure. As shown in FIG. 5, the system includes a disk management module, a virtualization management portal module and a VOI module.

The disk management module is a unified account opening/closing and network disk management module, and manages relevant information of a user. When being started, VOI, VDI and other services are registered to the module, and an interface method needed for account opening/closing and disk management is provided. The module possesses functions of account opening, account closing, query about network disk information, user login and the like.

Herein, the function of account opening refers to selecting a service module (including a VOI desktop, a VDI desktop and the like) needing to be account-opened to set relevant user attributes and network disk information, and adding a user to each service module after submission, and associating a network disk with the user.

The function of account closing refers to deleting a target user from each service, and deleting the network disk of the user after all services complete an account closing operation.

The function of login refers to unmounting a network shared disk from other virtual machines during login of the VOI or VDI desktop, and then mounting it to a login virtual machine.

The virtualization management portal module is an operation portal and management center of a VDI desktop virtual machine, and used to provide functional interfaces such as creation, opening, closing and deletion of the VDI virtual machine and the like, to execute creation and deletion operations on a network shared disk, and to store file path information corresponding to the network shared disk. Moreover, the virtualization management portal module provides disk mounting and unmounting methods for the VDI virtual machine. The VDI virtual machine managed by the module runs on a cluster Host in a virtual machine resource pool, VDI POOL, and all virtual machines use virtual machine disk files created on a shared storage.

The VOI module is similar to the virtualization management portal module. The VOI module provides a management function for a VOI virtual machine, and controls operations such as creation, opening, closing and destroying of the VOI virtual machine. Moreover, the VOI module provides unmounting and mounting functions for a network shared disk. The VOI virtual machine managed by the VOI module runs on a cluster Host in a virtual machine resource pool, VOI POOL, and the network shared disk can be accessed through a shared storage likewise.

The present alternative embodiment realizes data sharing of VDI and VOI virtual desktops by developing a new service interface and creating a network shared disk on a shared storage, to achieve the aim of integrated management. It is important to note that only one virtual machine can access a network disk at the same time during a using process.

On the basis of the system of the present alternative embodiment, the present alternative embodiment will be illustrated hereinbelow in conjunction with login processes of VOI and VDI virtual machines in the present alternative embodiment in detail.

Figure 6:
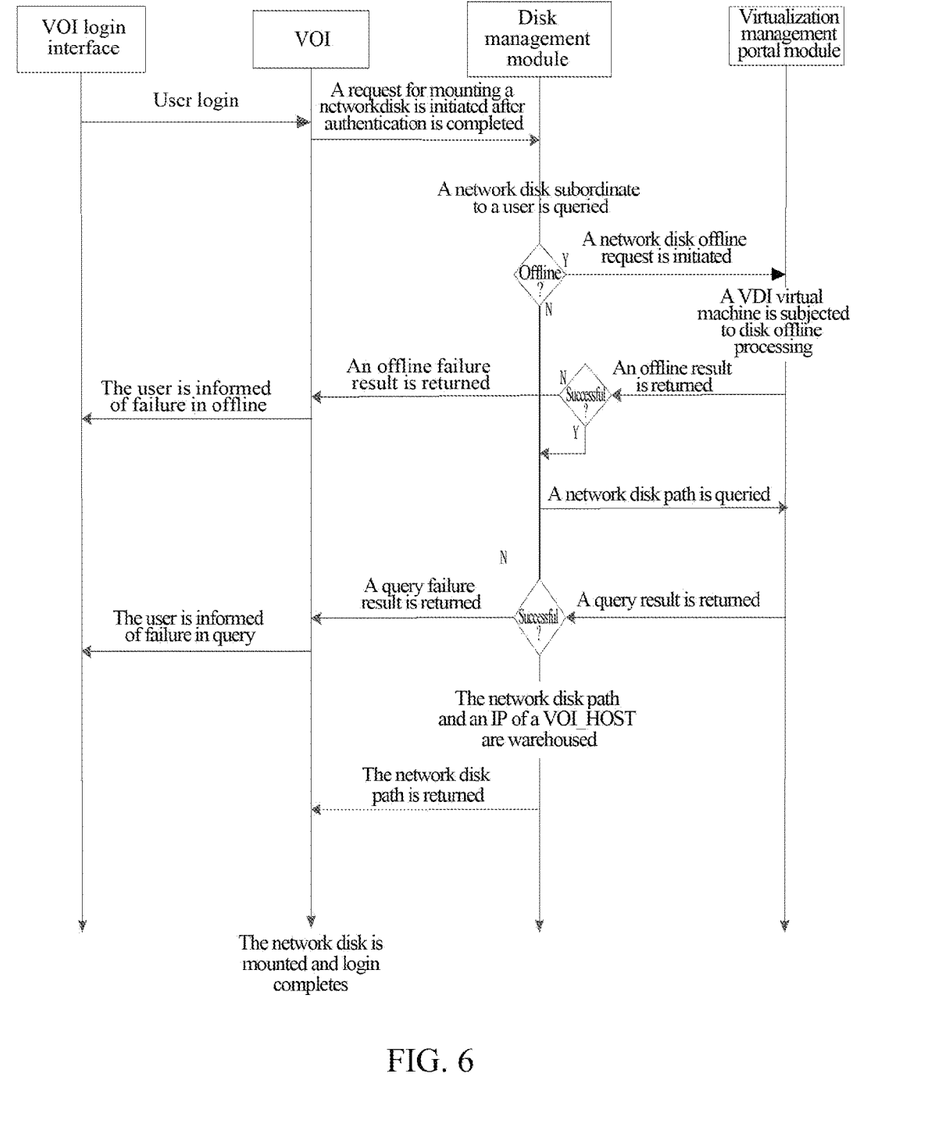
FIG. 6 is a flowchart of login of a VOI virtual machine according to an alternative embodiment of the present disclosure.

Herein, the login process of the VOI virtual machine includes the steps as follows.

In step S31, a user logs in by using a VOI client, and a VOI HOST completes a corresponding authentication operation and then calls an interface of a disk management module to query network shared disk information of the user.

In step S32, the disk management module searches for a network shared disk subordinate to the user, returns a file path of the disk if it is judged that the disk is in an independent state (i.e., the disk is not mounted to a VDI virtual machine), and records information such as an IP and a disk ID of the VOI HOST, for identifying the VOI HOST at next login of the VDI virtual machine.

In step S33, if the disk is mounted by the VDI virtual machine, it is necessary to initiate a request for unmounting a network disk to the virtualization management portal module. If the virtualization management portal module unmounts the network disk unsuccessfully, the VDI virtual machine is closed, and then an unmounting operation is executed.

In step S34, if unmounting is unsuccessful, the user is informed of unsuccessful offline and failure in login due to the fact that the network shared disk is mounted by the VDI virtual machine. If unmounting is successful, the file path corresponding to the disk is returned, and information such as the IP and the disk ID of the VOI HOST is recorded, for identifying the VOI_HOST at next login of the VDI virtual machine.

A detailed login process involved in step S31 to step S34 is as shown in FIG. 6. FIG. 6 is a flowchart of login of a VOI virtual machine according to an alternative embodiment of the present disclosure.

Figure 7:
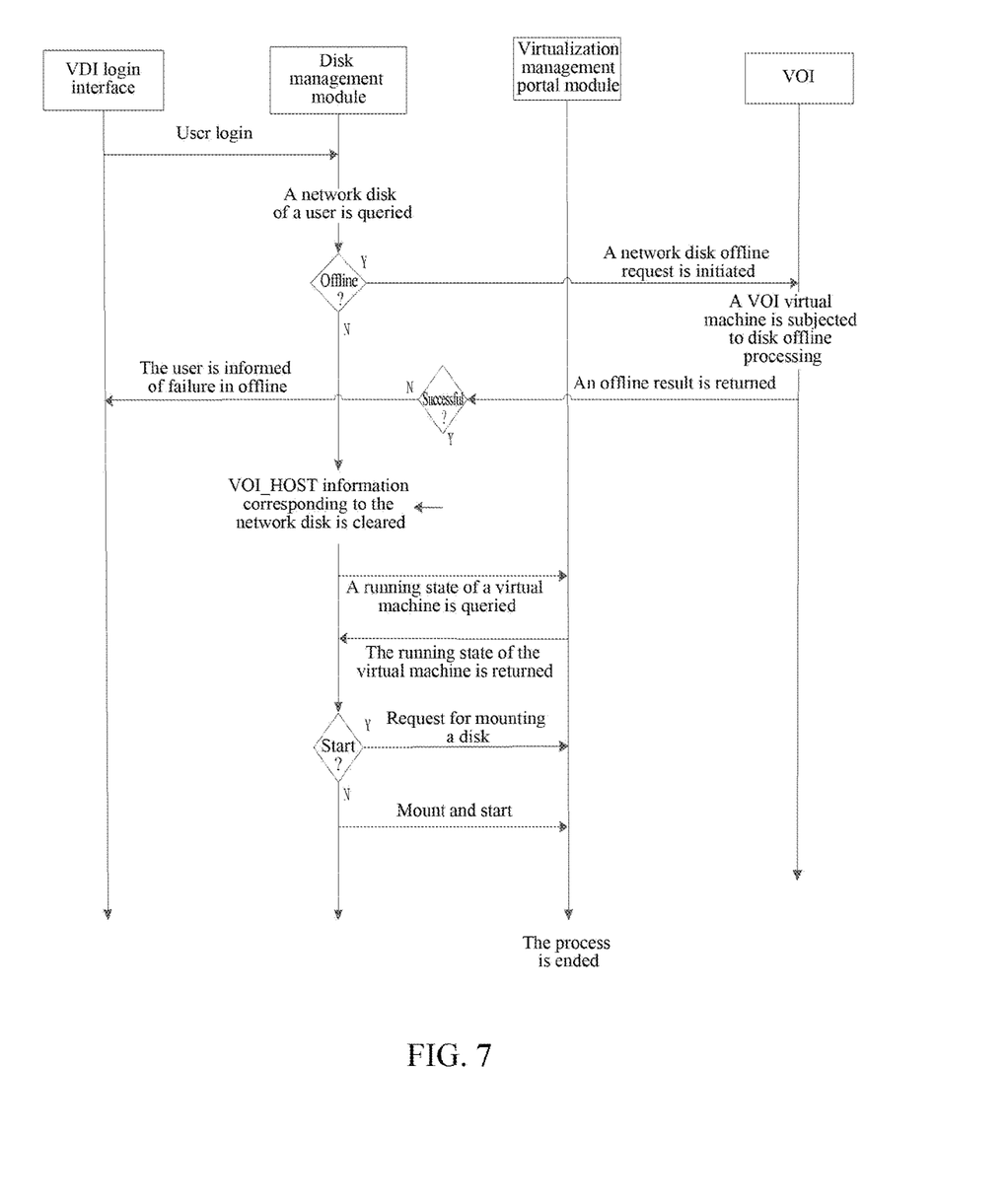
FIG. 7 is a flowchart of login of a VDI virtual machine according to an alternative embodiment of the present disclosure.

The login process of the VDI virtual machine includes the steps as follows.

In step S41, a user logs in by using a VDI client, and a disk management module completes a corresponding authentication operation.

In step S42, the disk management module searches for a network shared disk subordinate to the user, and judges whether the disk is in an independent state. If yes, S44 will be executed, and otherwise, S43 will be executed.

In step S43, the disk management module initiates a request for unmounting a network shared disk to a VOI HOST. If an online unmounting operation of the VOI HOST is unsuccessful, an operation of closing a VOI virtual machine is directly initiated, and then the disk is unmounted. If unmounting is unsuccessful, a prompt of unsuccessful disk unmounting is sent to the user.

In step S44, the disk is offline successfully, and the disk management module clears VOI HOST information corresponding to the network shared disk. Then, the disk management module queries a virtualization management portal module for a running state of a VDI virtual machine. If the VDI virtual machine is in an ON state currently, a disk mounting interface is directly called to mount the network shared disk to a virtual machine of the user. If the VDI virtual machine is in an OFF state currently, the network shared disk is mounted firstly, and then the virtual machine is started.

A detailed login process involved in step S41 to step S44 is as shown in FIG. 7. FIG. 7 is a flowchart of login of a VDI virtual machine according to an alternative embodiment of the present disclosure.

In another embodiment, a storage medium is also provided. The above-mentioned software is stored in the storage medium. The storage medium includes, but is not limited to, an optical disk, a floppy disk, a hard disk, an erasable memory and the like.

Obviously, a person skilled in the art shall understand that all of the above-mentioned modules or steps in the present disclosure may be implemented by using a general computing device, or may be centralized on a single computing device, or may be distributed on a network composed of a plurality of computing devices. In an exemplary embodiment, they may be implemented by using executable program codes of the computing devices. Thus, they may be stored in a storage apparatus and executed by the computing devices, and the shown or described steps may be executed in a sequence different from this sequence under certain conditions, or they are manufactured into each integrated circuit module respectively, or multiple modules or steps therein are manufactured into a single integrated circuit module for implementation. Thus, the present disclosure is not limited to combination of any specific hardware and software.

The above is only the alternative embodiments of the present disclosure, and not intended to limit the present disclosure. As will occur to a person skilled in the art, the present disclosure may have various modifications and changes. Any modifications, equivalent replacements, improvements and the like made within the essence and principle of the present disclosure shall fall within the scope of protection of the present disclosure.

INDUSTRIAL APPLICABILITY

By means of the embodiments of the present disclosure, when a user visits network disks through a designated virtual desktop architecture in multiple virtual desktop architectures, an association relationship between the user and a designated network disk in the multiple network disks is acquired, and an operation of mounting the designated virtual desktop architecture to the designated network disk is executed according to a current state of the designated network disk and the association relationship. Obviously, multiple virtual desktop architectures can be mounted to the same network disk, so that multiple virtual desktop architectures realize data sharing, the problem in the related art of difficulty in integrating a VDI with a VOI is solved, and the gaps in the related art are filled.

What is claimed is:

1. A method for integrating multiple virtual desktop architectures, comprising:
   when a user accesses a network disk through a designated virtual desktop architecture in multiple virtual desktop architectures, acquiring an association relationship between the user and a designated network disk in multiple network disks; and
   executing an operation of mounting the designated virtual desktop architecture to the designated network disk according to a current state of the designated network disk and the association relationship.

2. The method according to claim 1, wherein the executing an operation of mounting the designated virtual desktop architecture to the designated network disk according to a current state of the designated network disk and the association relationship comprises:
   when the designated network disk is in an independent state, mounting the designated virtual desktop architecture to the designated network disk according to the association relationship; and
   when the designated network disk is in a non-independent state, unmounting a virtual desktop architecture currently mounted to the designated network disk, and when the unmounting is successful, mounting the designated virtual desktop architecture to the network disk according to the association relationship.

3. The method according to claim 2, wherein
   when the virtual desktop architecture currently mounted to the designated network disk is unmounted unsuccessfully, the virtual desktop architecture currently mounted to the designated virtual desktop is closed, and an operation of continuing to unmount the currently-mounted virtual desktop architecture which has been closed is triggered;
   when the currently-mounted virtual desktop architecture which has been closed is unmounted successfully, the designated virtual desktop architecture is mounted to the network disk according to the association relationship; and
   when the currently-mounted virtual desktop architecture which has been closed is unmounted unsuccessfully, the user is informed that the designated virtual desktop architecture has been occupied, and the operation of mounting the designated virtual desktop architecture to the designated network disk is forbidden to be executed.

4. The method according to claim 1, wherein after executing an operation of mounting the designated virtual desktop architecture to the designated network disk according to a current state of the designated network disk and the association relationship, the method further comprises:
   deleting and/or adding an association relationship between the user and a network disk.

5. The method according to claim 1, wherein the virtual desktop architecture comprises: a Virtual Desktop Infrastructure, VDI, and a Virtual Operation System Infrastructure, VOI.

6. The method according to claim 2, wherein the virtual desktop architecture comprises: a Virtual Desktop Infrastructure, VDI, and a Virtual Operation System Infrastructure, VOI.

7. The method according to claim 3, wherein the virtual desktop architecture comprises: a Virtual Desktop Infrastructure, VDI, and a Virtual Operation System Infrastructure, VOI.

8. The method according to claim 4, wherein the virtual desktop architecture comprises: a Virtual Desktop Infrastructure, VDI, and a Virtual Operation System Infrastructure, VOI.

9. A device for integrating multiple virtual desktop architectures, comprising a non-transitory computer storage medium storing instructions that execute:
   an acquisition module configured to, when a user accesses a network disk through a designated virtual desktop architecture in multiple virtual desktop architectures, acquire an association relationship between the user and a designated network disk in the multiple network disks; and
   an execution module configured to execute an operation of mounting the designated virtual desktop architecture to the designated network disk according to a current state of the designated network disk and the association relationship.

10. The device according to claim 9, wherein the execution module comprises:
    a first mounting unit configured to, when the designated network disk is in an independent state, mount the designated virtual desktop architecture to the designated network disk according to the association relationship;
    a first unmounting unit configured to, when the designated network disk is in a non-independent state, unmount a virtual desktop architecture currently mounted to the designated network disk; and
    a second mounting unit configured to, when the virtual desktop architecture currently mounted to the designated network disk is unmounted successfully, mount the designated virtual desktop architecture to the network disk according to the association relationship.

11. The device according to claim 10, wherein the execution module further comprises:
    a closing unit configured to, when the virtual desktop architecture currently mounted to the designated network disk is unmounted unsuccessfully, close the virtual desktop architecture currently mounted to the designated virtual desktop, and trigger an operation of continuing to unmount the currently-mounted virtual desktop architecture which has been closed;
    a third mounting unit configured to, when the currently-mounted virtual desktop architecture which has been closed is unmounted successfully, mount the designated virtual desktop architecture to the network disk according to the association relationship; and
    an informing unit configured to, when the currently-mounted virtual desktop architecture which has been closed is unmounted unsuccessfully, inform the user that the designated virtual desktop architecture has been occupied, and the operation of mounting the designated virtual desktop architecture to the designated network disk is forbidden to be executed.

12. The device according to claim 9, wherein after executing the operation of mounting the designated virtual desktop architecture to the designated network disk according to the current state of the designated network disk and the association relationship, the non-transitory computer storage medium further comprises instructions that execute:
    a management module configured to delete and/or add an association relationship between the user and the network disk.

13. The device according to claim 9, wherein the virtual desktop architecture comprises: a Virtual Desktop Infrastructure, VDI, and a Virtual Operation System Infrastructure, VOI.

14. The device according to claim 10, wherein the virtual desktop architecture comprises: a Virtual Desktop Infrastructure, VDI, and a Virtual Operation System Infrastructure, VOI.

15. The device according to claim 11, wherein the virtual desktop architecture comprises: a Virtual Desktop Infrastructure, VDI, and a Virtual Operation System Infrastructure, VOI.

16. The device according to claim 12, wherein the virtual desktop architecture comprises: a Virtual Desktop Infrastructure, VDI, and a Virtual Operation System Infrastructure, VOI.

* * * * *